UNITED STATES PATENT OFFICE.

LEE S. HARRISON, OF PEORIA, ILLINOIS, ASSIGNOR OF ONE-HALF TO IRA S. MILLIKEN, OF HAMILTON, OHIO.

ART OF PREPARING CATTLE-FOOD.

SPECIFICATION forming part of Letters Patent No. 389,507, dated September 11, 1888.

Application filed November 23, 1886. Serial No. 219,666. (No specimens.)

*To all whom it may concern:*

Be it known that I, LEE SCOTT HARRISON, of Peoria, Peoria county, Illinois, have invented certain new and useful Improvements in the Art of Preparing Food for Cattle, of which the following is a specification.

My improved process will be readily understood from the following description. Grains of corn are hard, and more or less coated with fungoid matter, which is digusting to cattle and obstructive to digestion. It is desirable to soften and comminute the gluten and starch without gelatinizing the starch, and to avoid the presence of fungoid matter in the comminuted gluten and starch. In case corn is subjected to the action of water, the water, by contact with the nitrogenous matter of the grain, forms vegetable acids. The liquor thus formed becomes highly acid and attains a disagreeable odor and is disgusting to cattle. It is highly desirable to secure the comminuted gluten and starch free from this acid. In any treatment by water it is highly desirable to avoid the waste of valuable starch by permitting any of it to be carried away by the water.

By my improved process I secure a cattle-food consisting of soft but ungelatinized gluten and starch, with starch in maximum quantity and free from vegetable acid and fungoid matter.

In executing my improved process the corn is placed in a tank and steeped in water for a period of about twelve hours at an initial temperature of 140° to 160° Fahrenheit, varying according to the nature of the corn, the harder corn requiring the higher temperatures. During the steeping the corn will absorb heat from the water and the temperature of the entire mixture will go down to about 90° Fahrenheit, providing no means are supplied for maintaining the temperature, and preferably no attempt is made to maintain the temperature. At the end of twelve hours the water is run off. The result of this steeping is the formation of vegetable acids, the softening of the gluten and starch without gelatinizing the same, and the washing of the grain more or less free from fungoid matter. Had the initial temperature of the water been above the boiling-point the starch in the grain would have have become gelatinized. Had the initial temperature of the water been maintained below, but near the boiling-point throughout the steeping, the starch would have become gelatinized. Were the water too low in temperature the gluten would not be softened; hence I use steeping-water at a temperature sufficiently high to soften the gluten, and I avoid the gelatinizing of the starch by permitting the temperature of the mass to go down, instead of maintaining a continued temperature sufficiently high to cause the starch to gelatinize. The steeping-water having been run off, the corn is again subjected to a similar steeping as to time and temperatures, fresh steep-water of course being used. The second steeping, in case it were continued with the same water, with its temperature again raised sufficiently to further soften the gluten, would cause the starch and gluten to absorb the acid liquor and to become disagreeably tainted and unpalatable. The second steep-water is run off and the corn subjected to a third similar steeping under similar conditions and the water run off. In some cases the third steeping may not be required. These operations result in grains containing softened starch and gluten, with certain portions of the starch converted into saccharine matter and not gelatinized, and free from vegetable acids and fungoid matter. This peculiar product is now conveyed to a suitable grinding-mill and ground into a mass, and during the time of grinding a stream of water at about the temperature of 95° Fahrenheit is run into the mill, preferably in such amount that each bushel of corn represents one hundred and four and a half gallons of mill-liquor, and this mill-liquor being so graduated allows an easy method of calculating the amount fed. The liquor product of the mill is to be fed to the cattle at about the temperature of the stomach—say about 90° Fahrenheit.

The peculiar results of my process cannot be produced by any process of steeping subsequent to grinding, nor by any process of cooking before or after grinding, as any such processes will result in starch which is gelatinized, in gluten and starch saturated with vegetable acids and fungoid matter, and in a quantity of starch reduced by wastage.

I claim as my invention—

That improvement in the art of producing cattle-food from corn which consists in first steeping the corn in water having an initial temperature sufficiently high to partially soften the gluten and starch without gelatinizing the starch and to absorb fungoid matter from the grain, next in withdrawing the water and repeating the steeping in a new water at a similar temperature, next in withdrawing again the steeping-water, and finally in grinding the product thus produced in the presence of warm water, whereby is produced a maximum quantity of warm food consisting of comminuted softened but ungelatinized gluten and starch free from vegetable acid and fungoid matter.

LEE S. HARRISON.

Witnesses:
B. F. RHOTHHAMEL,
LESLIE D. PUTERBAUGH.

Correction in Letters Patent No. 389,507.

It is hereby certified that the name of the assignee in Letters Patent No. 389,507, granted September 11, 1888, upon the application of Lee S. Harrison, of Peoria, Illinois, for an improvement in the "Art of Preparing Cattle-Food," was erroneously written and printed "Ira S. Milliken;" that said name should have been written and printed *Ira S. Millikin*, and that the said Letters Patent should be read with this correction therein that the same may conform to the record of the case in the Patent Office.

Signed, countersigned, and sealed this 18th day of September, A. D. 1888.

[SEAL.]

D. L. HAWKINS,
*Assistant Secretary of the Interior.*

Countersigned:

BENTON J. HALL,
*Commissioner of Patents.*